(12) United States Patent
Verma et al.

(10) Patent No.: US 8,639,978 B2
(45) Date of Patent: Jan. 28, 2014

(54) TOPOLOGY INDEPENDENT NETWORK-BASED AUTOMATION INFRASTRUCTURE

(75) Inventors: Mohan Verma, Sunnyvale, CA (US);
Ajay Singh, Noida Uttar Pradesh (IN);
Ishaan Gokhale, San Jose, CA (US);
Pavel Semernin, San Jose, CA (US);
Prabhat Regmi, Santa Clara, CA (US);
Abhinethra T. Maras, San Jose, CA (US); Pragadesh Rajasekar, Sunnyvale, CA (US); Sreenivasulu Lekkala, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 448 days.

(21) Appl. No.: 13/101,028

(22) Filed: May 4, 2011

(65) Prior Publication Data
US 2012/0284564 A1 Nov. 8, 2012

(51) Int. Cl.
*G06F 11/00* (2006.01)

(52) U.S. Cl.
USPC ............ 714/25; 702/117; 702/118; 702/119; 714/32; 714/33; 714/37; 714/40

(58) Field of Classification Search
USPC .......... 702/117, 118, 119; 714/27, 32, 33, 37, 714/40
See application file for complete search history.

(56) References Cited

U.S. PATENT DOCUMENTS

| 6,708,324 B1 * | 3/2004 | Solloway et al. ............. 717/124 |
| 2008/0120521 A1 * | 5/2008 | Poisson et al. ................. 714/26 |

* cited by examiner

*Primary Examiner* — Joshua P Lottich
(74) *Attorney, Agent, or Firm* — Varun A. Shah

(57) ABSTRACT

An automation process verifies that a test bed includes a set of devices specified by at least one script which are to be executed by the automation process on the test bed. The test bed is locked and the set of devices is allocated to the automation process. Performance data collection and logging for the set of devices is started and the at least one script is executed on the set of devices. After executing the at least one script, the set of devices is de-allocated and the test bed is unlocked. A notification is generated indicating that the at least one script has been executed.

18 Claims, 5 Drawing Sheets

TOPOLOGY INDEPENDENT NETWORK-BASED AUTOMATION INFRASTRUCTURE

FIELD OF THE INVENTION

Embodiments of the invention are generally directed toward a testing automation harness and more specifically toward a device-under-test independent testing automation harness.

BACKGROUND

Existing testing automation harnesses include a number of scripts that can be executed at a given time or interval with certain parameters. The scripts used with these existing harnesses and thus the harnesses are dependent on the topology. That is, the harness can only execute scripts against a particular testbed or network infrastructure. Testbeds generally consist of a DUT (device under test) or a set of DUTs. Pre-recorded scripts are executed against the DUT(s), and generally may only be executed against the DUT(s) for which they were a recorded.

SUMMARY

An automation process verifies that a test bed includes a set of devices specified by at least one script which are to be executed by the automation process on the test bed. The test bed is locked and the set of devices is allocated to the automation process. Performance data collection and logging for the set of devices is started and the at least one script is executed on the set of devices. After executing the at least one script, the set of devices is de-allocated and the test bed is unlocked. A notification is generated indicating that the at least one script has been executed.

DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
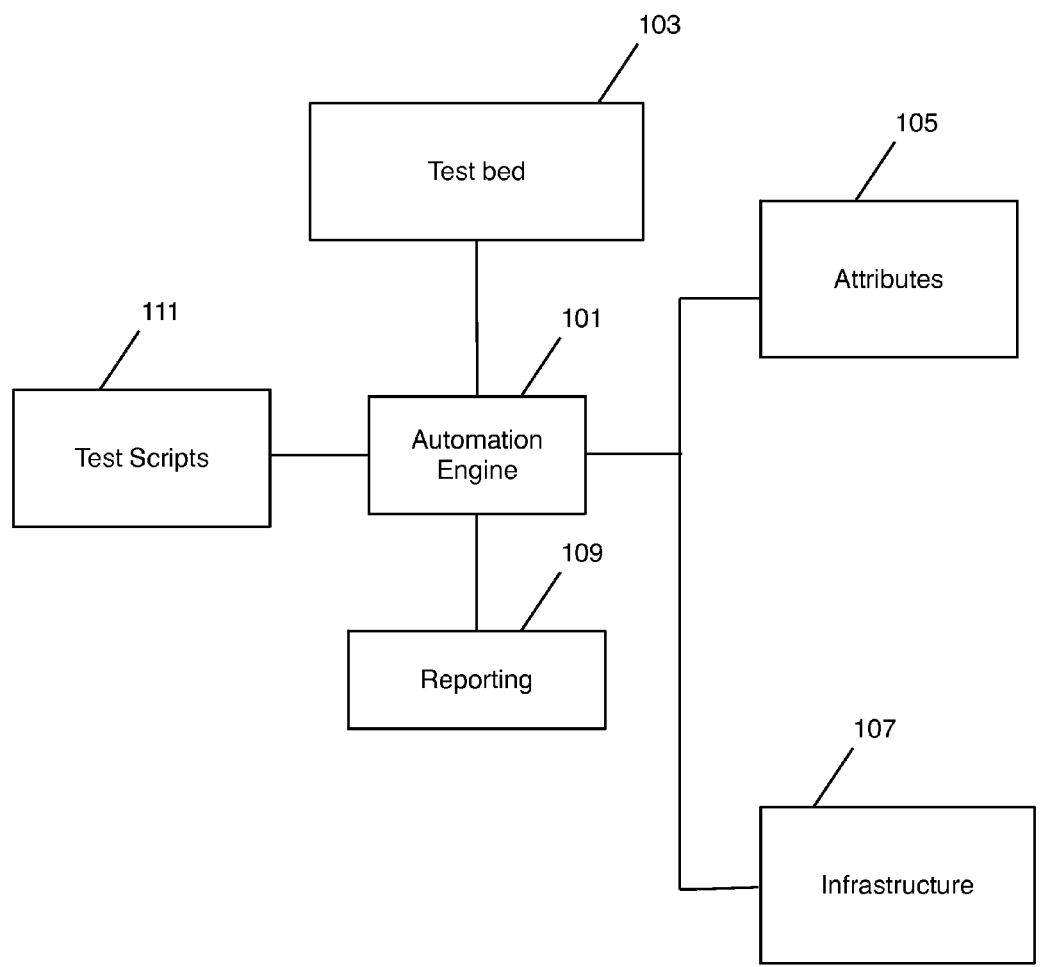
FIG. 1 is a diagram illustrating a topology independent network-based automation infrastructure according to an embodiment of the invention.

FIG. 1 is a diagram illustrating a topology independent network-based automation infrastructure according to an embodiment of the invention. Automation engine 101 is the core of the infrastructure and in some embodiments performs the majority of the processing associated with supporting the infrastructure. For example, engine 101 may coordinate activities of the infrastructure, such as performing test runs, generating logs and reports, and making logs and reports available to users of the infrastructure. The methods illustrated in FIGS. 2-4 may, in some embodiments, also be performed by the automation engine 101. Automation engine 101 may be implemented using a data processing system, such as the data processing system illustrated in FIG. 5.

Test bed 103 may be a collection of devices segregated into groups which are reachable by each other through a network. The devices may be grouped to achieve or test a purpose of the test bed. In one embodiment, the test bed 103 includes one or more devices-under-test (DUT), supporting devices, routing and/or switching devices, servers hosting various operating systems, various models of servers or devices providing different capabilities, and packet generators. In other embodiments, different and/or additional devices may be included. Test bed 103 may also include various files which specify the details of the test bed and its devices, such as access information for the devices, connection information for the devices, and types of the devices. In one embodiment, multiple instances of the automation engine 101 may run simultaneously. The multiple instances may run on different systems or in separate virtual machines on a single system. They may share a test bed in a serial fashion or in parallel if the requirements of the scripts being executed by the different automation engines are mutually exclusive with respect to the portion of the test bed that is required.

Test scripts 111 may include scripts which specify action or configuration information for a given device or set of devices. Test scripts 111 may also include verification scripts for determining if the configuration of the test bed is correct for a particular test script or scripts. Other verification scripts may be included which determine whether the results of a test script indicate success or failure. These verification scripts may depend on libraries stored as part of infrastructure 107. Scripts from test scripts 111 may be further configured when executed by automation engine 101 using parameters received by the automation engine 101.

Reporting 109 may generate reports and logs based on executed test scripts from test scripts 111. The reports and logs may be file-based, web-based, database-based, or use a combination of these elements. Reports and logs can be generated during or after the execution of a test script. Reports and logs may be made available at any time after generation and may be referenced to determine the success or failure of test scripts applied to the test bed.

Attributes 105 may provide default parameters and allowable parameters pertaining to various states of a particular device or other element of the infrastructure. The default attributes may be used to finish configuring a test script or test bed being used by the automation engine. The allowable parameters may be used to determine whether parameters associated with a script are within the capabilities of the devices or other elements of the test bed.

Infrastructure 107 may include a collection of various libraries, third-party software integrations, and training materials. Infrastructure 107 may further include a queuing system which can manage the serialization and parallel execution of test scripts on devices in the test bed.

Figure 2:
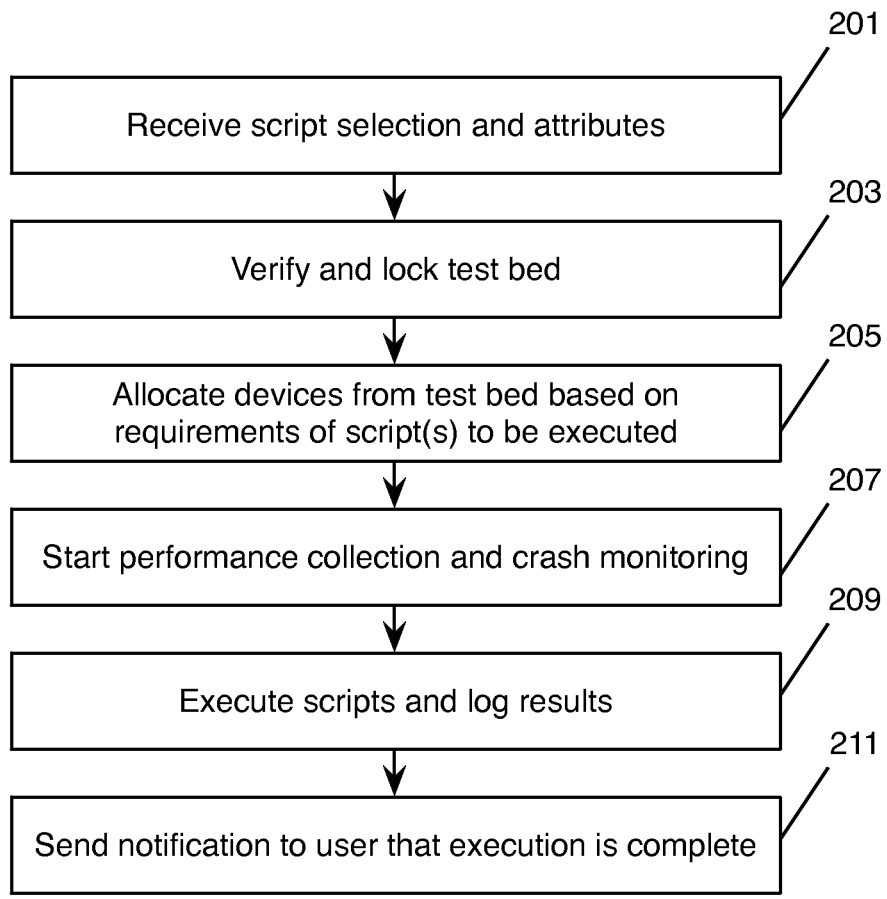
FIG. 2 is a flow chart illustrating a method of executing one or more scripts on a test bed in a topology independent network-based automation infrastructure according to an embodiment of the invention.

FIG. 2 is a flow chart illustrating a method of executing one or more scripts on a test bed in a topology independent network-based automation infrastructure. In one embodiment, this method may be performed by automation engine 101 in FIG. 1.

At block 201, the method receives a script selection and attributes. The script selection may include one or more scripts to be executed on a test bed. The script selection may also include parameters specifying a test bed/device against which to perform the scripts. The parameters and attributes may be specified by a user using a CLI (command line interface) or another interface such as a GUI (graphical user interface). The received attributes and parameters may be compared to allowable attributes and parameters as described above with respect to attributes 105 in FIG. 1. If the received attributes and parameters are in conflict with the allowance attributes and parameters, the method may replace the value of the received attribute or parameter with an allowable value. Alternatively, the method may indicate an error to a user. If a required attribute or parameter is not received, a default value for the attribute or parameter may be used. Required attributes and parameters may be required by the infrastructure itself or may be specified by a script.

At block 203, the method verifies that the test bed meets the requirements of the selected scripts and locks the test bed specified by the input received at block 201. The test bed is reserved for the scripts that are to be executed and may be released after script execution is complete. Generally, a script requires at least a certain set of devices to be present in the test bed. If the test bed includes a superset of the required devices (i.e., the required devices plus additional devices) the script can still be executed used the test bed. Verifying that a test bed meets the requirements of the selected script is described in greater detail below in conjunction with FIG. 3.

At block 205, the method allocates devices from the test bed based on the requirements of the script(s) to be executed. Device allocation is described in greater detail below in conjunction with FIG. 3. At block 207, the method starts performance collection and crash monitoring of the test bed. An initial set of data is gathered before execution of the scripts to provide a point of reference when reviewing the results of the script execution.

At block 209, the method executes the scripts and logs results of the script execution. In one embodiment, the method uses a bulk execution of scripts. The content and/or purpose of the scripts may or may not be related. Bulk execution may be used in regression cycle testing or when a particular module needs to be tested as a result of changes in an environment or device. In another embodiment, the method may use a single script execution. This mode is generally the fastest and may be used when refining or developing a test script. In yet another embodiment, a controlled execution may be used. In a controlled execution of a script, a user may determine when to pass a parameter to the script or otherwise control the execution (e.g., stepping through individual instructions in the script, halting the execution, or modifying the script and/or attributes/parameters). The results of the scripts may be logged and reports may be generated describing the results. The reports and logs may be stored as files, web pages, entries in a database, or a combination.

At block 211, the method sends a notification to the user that execution of the script(s) has been completed. This notifies the user that the user can review the results in the logs and/or reports generated at block 209.

Figure 3:
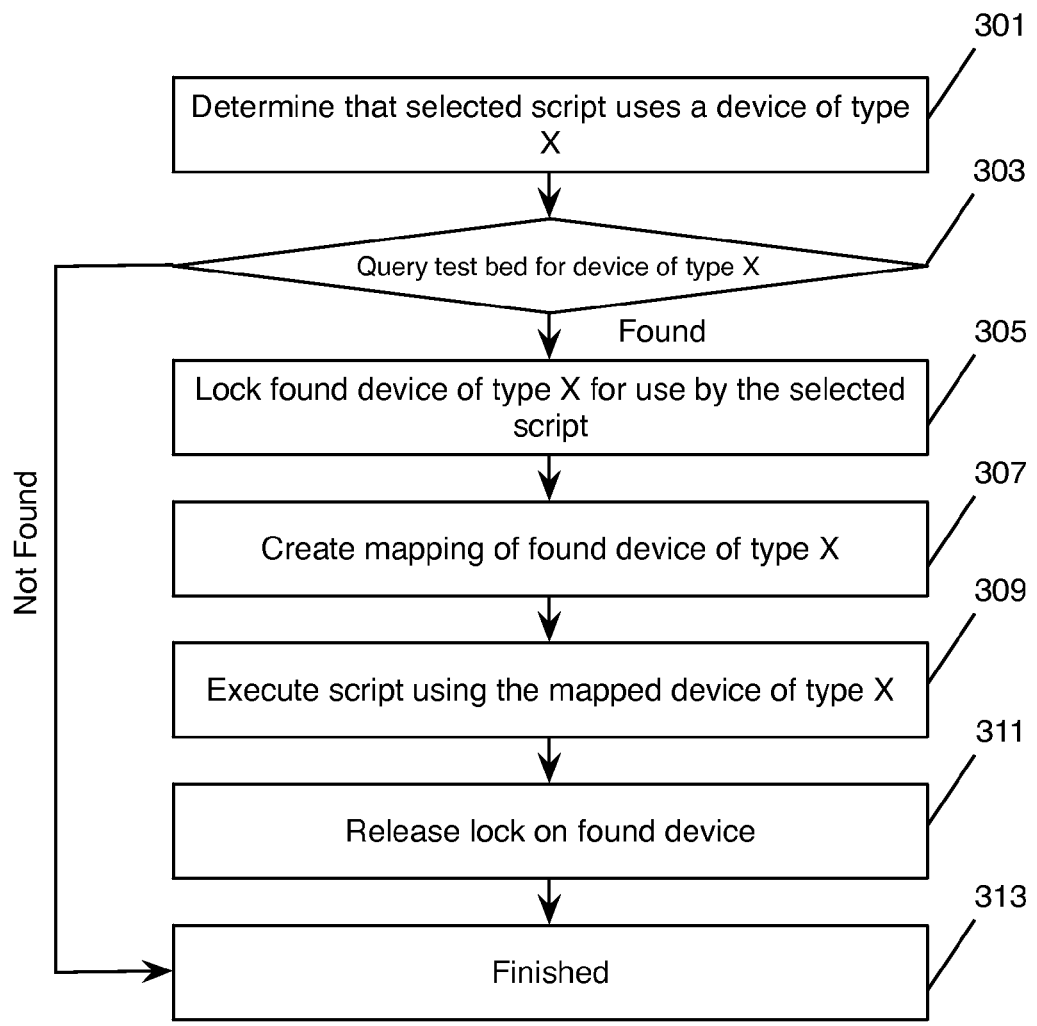
FIG. 3 is a flow chart illustrated a method of verifying that a test bed includes the devices required by a test script according to an embodiment of the invention.

FIG. 3 is a flow chart illustrating a method of verifying that a test bed includes the devices required by a test script. The method may be performed by the automation engine 101 as part of the method illustrated in FIG. 2. In some embodiments, scripts require multiple devices which may be of different types. In those embodiment, the method illustrated in FIG. 3 may be performed multiple times to ensure that each and every requirement of a test script is met by the test bed. In situations where multiple scripts are to be executed (i.e., bulk execution), the method may create a union of requirements of some or all of the test scripts to be executed and determine if the test bed satisfies the requirements of the some or all of the test scripts.

At block 301, the method determines that a selected script uses a device of type X. At block 303, the method queries the test bed for a device of type X. If a device of type X is found in the test bed, the method proceeds to block 305. Otherwise, the method proceeds to block 313 and execution of the script fails since the requirements of the script are not met by the available test bed. Scripts may include mandatory and suggested requirements. If a mandatory requirement is not met, the script fails, however, if a suggested requirement is not met, the script may proceed while generating a warning message in the logs.

At block 305, the method locks the type X device found in the test bed for use by the selected script. A locked device is only available to the testing process which locks it. At block 307, the method creates a mapping of the found device of type X. The mapping acts as a middleman between references to a the device in the script and the device itself in the test bed. In other words, the mapping links the script to the required device. At block 309, the method executes the script using the mapped device. Execution of scripts is described in greater detail above in conjunction with FIG. 2.

At block 311, the method releases the lock on the found device. This allows other processes to use the device. At block 313, the method finishes.

Figure 4:
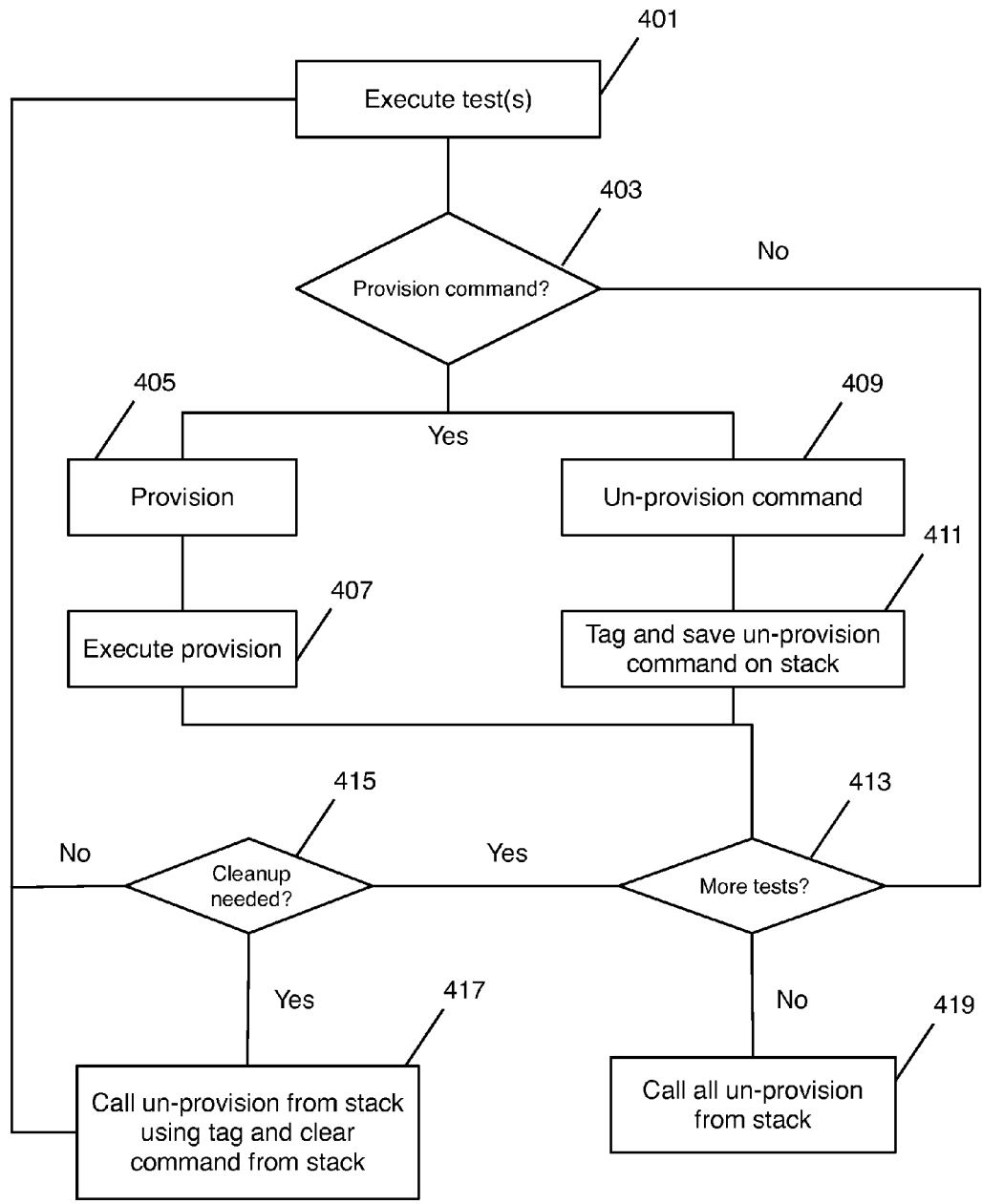
FIG. 4 is a flow chart illustrating a method of restoring a test bed to its original state after one or more test scripts have been executed according to an embodiment of the invention.

FIG. 4 is a flow chart illustrating a method of restoring a test bed to its original state after one or more test scripts have been executed. In one embodiment, the automation engine 101 may execute this method in parallel with the method illustrated in FIG. 2.

At block 401, the method begins running a test script as described above. At block 403, the method determines whether the script being executed includes one or more provision commands, which modify the state of a device in the test bed. If the script includes a provision command, control passes to blocks 405 and 409. Otherwise, control passes to block 413.

At block 405, the method reads the provision command from the script and at block 407 executes the provision command, modifying a device in the test bed. In parallel, the method generates an un-provision command corresponding to the provision command at block 405. At block 411, the method tags the un-provision command and pushes the un-provision command onto a stack, which is a data structure well known in the computing arts.

At block 413, the method determines if more tests are to be executed. If more tests are to be executed, control passes to decision block 415. Otherwise, control passes to block 419.

At decision 415, the method determines whether cleanup is needed before the next test is executed. If cleanup is needed, control passes to block 417. Otherwise, control returns to block 401. Cleanup may not be needed if the remaining tests do not conflict with, or are dependent on, the already-executed test(s).

At block 417, the method calls each un-provision command on the stack using the tags and a clear command provided by the stack. In this way, the state of the test bed is reverted, one un-provision command at a time, to the original state of the test bed. Control then passes block 401 to execute the next script.

At block 419, the method reverts the test bed to its original state by applying the un-provision commands on the stack.

Figure 5:
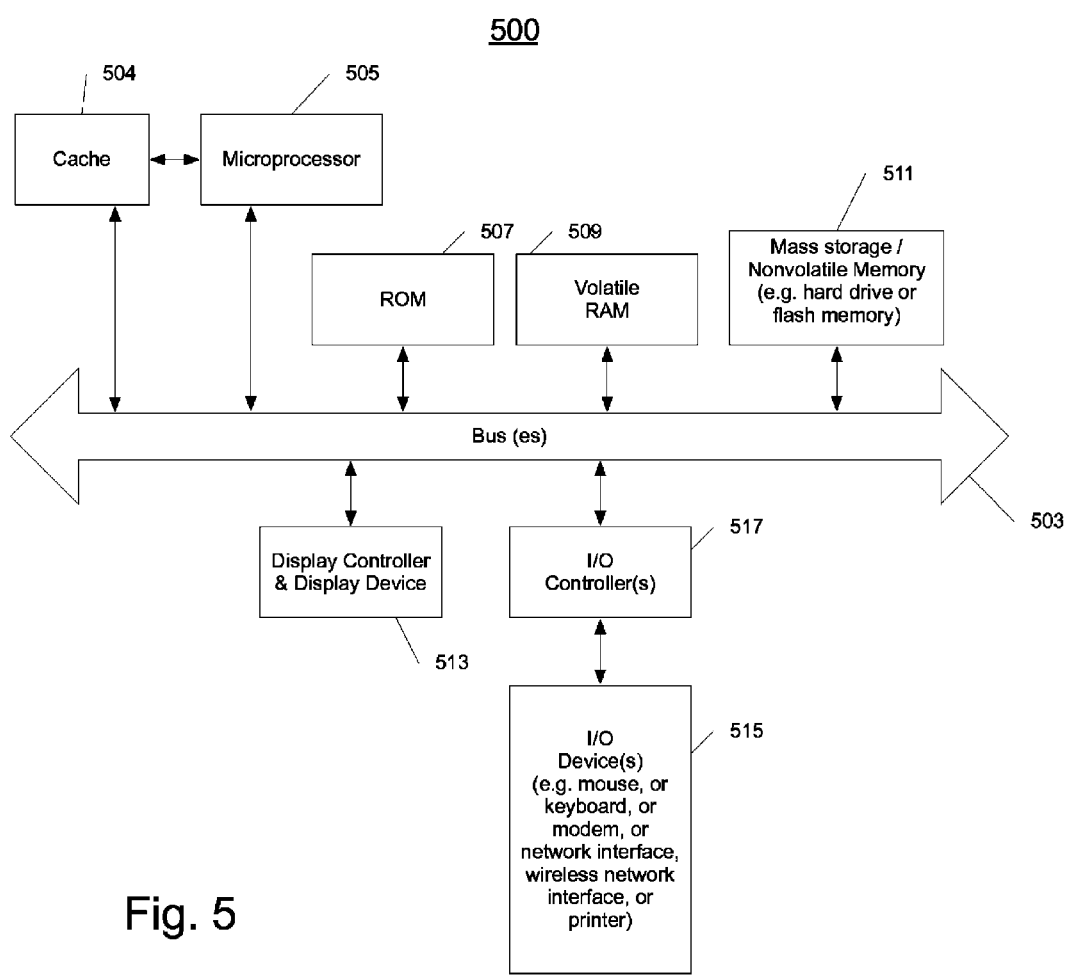
FIG. 5 is a diagram illustrating a data processing system that may be used with an embodiment of the invention.

FIG. 5 shows one example of a data processing system, which may be used with one embodiment the present invention. Note that while FIG. 5 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 5, the computer system 500, which is a form of a data processing system, includes a bus 503 which is coupled to a microprocessor(s) 505, cache(s) 504, and a ROM (Read Only Memory) 507 and volatile RAM 509 and a non-volatile memory 511. The microprocessor 505 is coupled to cache 504. The microprocessor 505 may retrieve the instructions from the memories 507, 509, 511 and execute the instructions to perform operations described above. The bus 503 interconnects these various components together and also interconnects these components 504, 505, 507, 509, and 511 to a display controller and display device 513 and to peripheral devices such as input/output (I/O) devices which may be mice, touch screens, touch pads, touch sensitive input devices, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory. Various embodiments of the invention may utilize tangible storage media such as DRAM, disk drives, flash drives, and other types of tangible storage. Non-transitory storage media may be used as well, including DRAM, disk drives, flash drives, etc.

The mass storage 511 is typically a magnetic hard drive or a magnetic optical drive or an optical drive or a DVD RAM or a flash memory or other types of memory systems which maintain data (e.g., large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art. In one embodiment, a test bed may include several devices as described above and may be coupled to the data processing system over a network through a network adapter.

In the foregoing specification, topology independent network-based automation infrastructure has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   verifying, by an automation process executing on a data processing system, that a test bed includes a set of devices specified by at least one script to be executed on the test bed;
   locking the test bed;
   allocating the set of devices to the automation process;
   starting performance data collection and logging for the set of devices;
   executing the at least one script on the set of devices;
   de-allocating the set of devices after executing the at least one script;
   unlocking the test bed; and
   generating a notification indicating that the at least one script has been executed.

2. The method of claim 1, wherein verifying that a test bed includes a set of devices comprises:
   determining that a script requires a device of a first type;
   locking the device of the first type in response to determining that the test bed includes the device of the first type; and
   creating a mapping of the device of the first type, wherein the mapping links the script to the device of the first type.

3. The method of claim 1, wherein executing the at least one script comprises:
   determining that the at least one script includes a provision command modifying a state of one of the devices in the set of devices;
   extracting the provision command from the script;
   executing the provision command on the set of devices;
   creating an un-provision command using the provision command, wherein executing the un-provision command reverts the state of a device to an original state;
   tagging the un-provision command; and
   pushing the un-provision command on to a stack.

4. The method of claim 3, wherein de-allocating the set of the devices comprises:
   determining that all scripts have been executed;
   executing each un-provision command on the stack.

5. The method of claim 1, further comprising:
   receiving a set of parameters and attributes with a selection of the at least one script;
   comparing the set of parameters and attributes to one or more allowable ranges extracted from a data source; and
   modifying the set of parameters and attributes to be consistent with the allowable ranges.

6. The method of claim 5, further comprising:
   comparing the received set of parameters and attributes to a set of required parameters and attributes of the at least one script; and
   inserting a default value for a required parameter or attribute not included in the received set of parameters and attributes, wherein the default value is extracted from the data source.

7. A non-transitory machine readable storage medium storing executable instructions which when executed by a processor cause the processor to perform operations comprising:
   verifying, by an automation process, that a test bed includes a set of devices specified by at least one script to be executed on the test bed;
   locking the test bed;
   allocating the set of devices to the automation process;
   starting performance data collection and logging for the set of devices;

executing the at least one script on the set of devices;
de-allocating the set of devices after executing the at least one script;
unlocking the test bed; and
generating a notification indicating that the at least one script has been executed.

8. The non-transitory machine readable storage medium of claim 7, wherein verifying that a test bed includes a set of devices comprises:
determining that a script requires a device of a first type;
locking the device of the first type in response to determining that the test bed includes the device of the first type; and
creating a mapping of the device of the first type, wherein the mapping links the script to the device of the first type.

9. The non-transitory machine readable storage medium of claim 7, wherein executing the at least one script comprises:
determining that the at least one script includes a provision command modifying a state of one of the devices in the set of devices;
extracting the provision command from the script;
executing the provision command on the set of devices;
creating an un-provision command using the provision command, wherein executing the un-provision command reverts the state of a device to an original state;
tagging the un-provision command; and
pushing the un-provision command on to a stack.

10. The non-transitory machine readable storage medium of claim 9, wherein de-allocating the set of the devices comprises:
determining that all scripts have been executed;
executing each un-provision command on the stack.

11. The non-transitory machine readable storage medium of claim 7, further comprising:
receiving a set of parameters and attributes with a selection of the at least one script;
comparing the set of parameters and attributes to one or more allowable ranges extracted from a data source; and
modifying the set of parameters and attributes to be consistent with the allowable ranges.

12. The non-transitory machine readable storage medium of claim 11, further comprising:
comparing the received set of parameters and attributes to a set of required parameters and attributes of the at least one script; and
inserting a default value for a required parameter or attribute not included in the received set of parameters and attributes, wherein the default value is extracted from the data source.

13. A hardware-based data processing system comprising:
means for verifying, by an automation process executing on a hardware device, that a test bed includes a set of devices specified by at least one script to be executed on the test bed;
means for locking the test bed;
means for allocating the set of devices to the automation process;
means for starting performance data collection and logging for the set of devices;
means for executing the at least one script on the set of devices;
means for de-allocating the set of devices after executing the at least one script;
means for unlocking the test bed; and
means for generating a notification indicating that the at least one script has been executed.

14. The data processing system of claim 13, wherein verifying that a test bed includes a set of devices comprises:
means for determining that a script requires a device of a first type;
means for locking the device of the first type in response to determining that the test bed includes the device of the first type; and
means for creating a mapping of the device of the first type, wherein the mapping links the script to the device of the first type.

15. The data processing system of claim 13, wherein executing the at least one script comprises:
means for determining that the at least one script includes a provision command modifying a state of one of the devices in the set of devices;
means for extracting the provision command from the script;
means for executing the provision command on the set of devices;
means for creating an un-provision command using the provision command, wherein executing the un-provision command reverts the state of a device to an original state;
means for tagging the un-provision command; and
means for pushing the un-provision command on to a stack.

16. The data processing system of claim 15, wherein de-allocating the set of the devices comprises:
means for determining that all scripts have been executed;
means for executing each un-provision command on the stack.

17. The data processing system of claim 13, further comprising:
means for receiving a set of parameters and attributes with a selection of the at least one script;
means for comparing the set of parameters and attributes to one or more allowable ranges extracted from a data source; and
means for modifying the set of parameters and attributes to be consistent with the allowable ranges.

18. The data processing system of claim 17, further comprising:
means for comparing the received set of parameters and attributes to a set of required parameters and attributes of the at least one script; and
means for inserting a default value for a required parameter or attribute not included in the received set of parameters and attributes, wherein the default value is extracted from the data source.

* * * * *